(12) United States Patent
Philipps

(10) Patent No.: US 8,794,077 B2
(45) Date of Patent: Aug. 5, 2014

(54) PRESSURE SENSOR

(75) Inventor: Michael Philipps, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 203 days.

(21) Appl. No.: 13/258,543

(22) PCT Filed: Mar. 24, 2010

(86) PCT No.: PCT/EP2010/053825
§ 371 (c)(1),
(2), (4) Date: Sep. 22, 2011

(87) PCT Pub. No.: WO2010/108949
PCT Pub. Date: Sep. 30, 2010

(65) Prior Publication Data
US 2012/0017690 A1     Jan. 26, 2012

(30) Foreign Application Priority Data
Mar. 26, 2009 (DE) .......... 10 2009 001 892

(51) Int. Cl.
*G01L 9/00* (2006.01)

(52) U.S. Cl.
USPC .......................................................... 73/754

(58) Field of Classification Search
USPC ................................. 73/700–756
See application file for complete search history.

(56) References Cited

U.S. PATENT DOCUMENTS

| | | | | |
|---|---|---|---|---|
| 4,945,769 A * | 8/1990 | Sidner et al. | ..... | 73/727 |
| 4,993,143 A * | 2/1991 | Sidner et al. | ..... | 438/53 |
| 5,289,721 A * | 3/1994 | Tanizawa et al. | ..... | 73/727 |
| 5,877,039 A * | 3/1999 | Tanizawa | ..... | 438/53 |
| 6,003,381 A | 12/1999 | Kato | | |
| 7,343,805 B2 * | 3/2008 | Combi et al. | ..... | 73/702 |
| 2004/0079159 A1* | 4/2004 | Muchow | ..... | 73/716 |
| 2008/0202248 A1* | 8/2008 | Tojo et al. | ..... | 73/721 |

FOREIGN PATENT DOCUMENTS

| | | |
|---|---|---|
| DE | 1698121 | 2/1972 |
| DE | 254271 | 2/1988 |
| DE | 102007053859 | 5/2009 |
| JP | 3-29829 | 2/1991 |

OTHER PUBLICATIONS

German Search Report in corresponding German Application No. 10 2009 001 892.1.
International Search Report in corresponding International Application No. PCT/EP2010/053825.

(Continued)

*Primary Examiner* — Andre Allen
(74) *Attorney, Agent, or Firm* — Bacon & Thomas, PLLC

(57) ABSTRACT

A pressure sensor, comprising: a monocrystalline membrane body, which includes a measuring membrane and an edge region surrounding the measuring membrane. The edge region has a greater material thickness than the measuring membrane and the edge region has a first mounting surface, whose surface normal is given by a first principal crystal axis. A monocrystalline substrate, which with respect to crystal structure, comprises the same semiconductor material as the membrane body, the substrate has a second mounting surface, whose surface normal extends parallel to the first principal crystal axis. The membrane body is tightly connected to the substrate by joining the first mounting surface to the second mounting surface. The orientations of other principal crystal axes of the membrane body and the substrate are, in each case, oriented parallel relative to one another.

11 Claims, 2 Drawing Sheets

(56) References Cited

OTHER PUBLICATIONS

Fan He et al., "A silicon directly bonded capacitive absolute pressure sensor", Sensors and Actuators A, vol. 135, Apr. 2007, pp. 507-514.
Pfeifer, Werthschutzky: "Drucksensoren", 1989, Berlin, pp. 126-131.
Drago Resnik et al., "Study of low-temperature direct bonding of (111) and (100) silicon wafers under various ambient and surface conditions", Sensors and Actuators A, vol. 80, 2000, pp. 68-76.
English translation of the International Preliminary Examination Report.

* cited by examiner

= {100}
= {110}
= {111}

PRESSURE SENSOR

TECHNICAL FIELD

The present invention relates to a pressure sensor, especially a pressure sensor having: a monocrystalline (single crystal) membrane body, which includes a measuring membrane and an edge region surrounding the measuring membrane; and a monocrystalline substrate; wherein the membrane body is tightly connected to the substrate along a mounting surface of the edge region.

Such pressure sensors are available from Endress+Hauser, for example, in the form of pressure difference measurement transmitters under the mark "Deltabar" and in the form of pressure measurement transmitters having a hydraulic pressure transfer means, under the mark "Cerabar".

BACKGROUND DISCUSSION

The membrane body and the substrate especially are monocrystalline silicon, wherein the mounting surfaces to be connected to one another have a normal, which, in each case, is given by the same principal crystal axis, for example, a <100> axis. The substrate and the membrane body are joined to one another by a eutectic bond, which includes an intermediate layer of gold, which is required for forming the eutectic.

Alternatively, a connection by what is called fusion bonding is possible for this. Although the described procedure and the generic pressure sensors deliver satisfactory measurement results, there are nevertheless reactions between the substrate and the membrane body, which can occur due to the anisotropy of the mechanical and electrical material parameters. Thus, for example, the modulus of elasticity of silicon in a <100> direction is 130 GPa, in a <110> direction 169 GPa and in a <111> direction 188 GPa.

SUMMARY OF THE INVENTION

At the interface between the mounting surfaces, considerable jumps in the directionally dependent, crystal properties can occur, in spite of identical surface normals. This is due to poor lateral orientation of the mounting surfaces relative to one another. It is, therefore, an object of the present invention to provide a pressure sensor, which overcomes these disadvantages.

According to the invention, this object is achieved by. A pressure sensor, a semiconductor pressure sensor for example, which comprises: a monocrystalline membrane body, which includes a measuring membrane and an edge region surrounding the measuring membrane; wherein the edge region has a greater material thickness than the measuring membrane, and wherein the edge region has a first mounting surface, whose surface normal is given by a first principal crystal axis; and a monocrystalline substrate, which, with respect to crystal structure, comprises the same semiconductor material as the membrane body; wherein the substrate has a second mounting surface, whose surface normal extends parallel to the first principal crystal axis; wherein the membrane body is tightly connected to the substrate by joining the first mounting surface to the second mounting surface; and wherein, according to the invention, orientations of other principal crystal axes of the membrane body and substrate are, in each case, also oriented parallel relative to one another.

In an embodiment of the invention, the membrane body and the substrate comprise Si, SiC or sapphire.

In a further development of the invention, the first principal crystal axis is, for Si for example, a <100> or a <111> axis.

In a further development of the invention, the first mounting surface and the second mounting surface are joined by means of a eutectic bond.

In an alternative further development of the invention, the first mounting surface and the second mounting surface are joined by means of fusion bonding, wherein the first mounting surface and the second mounting surface are joined especially as a wafer assembly before separating the sensors. This is referred to as full wafer bonding.

According to an embodiment of the invention, the pressure sensor of the invention comprises a transducer for transducing a pressure dependent deflection of the measuring membrane into an electrical signal, wherein the transducer especially can be a (piezo) resistive transducer or a capacitive transducer.

The pressure sensor of the invention can be an absolute pressure sensor, a relative pressure sensor or a pressure difference sensor, wherein an absolute pressure sensor measures a media pressure against vacuum, a relative pressure sensor measures a media pressure against atmospheric pressure, and a pressure difference sensor measures the difference between a first media pressure and a second media pressure.

The pressure sensor of the invention offers the advantages, compared to the state of the art that, on the one hand, the probability for defects between the substrate and membrane body is significantly reduced, and that, on the other hand, the anisotropic material properties in the vicinity of the mounting surfaces no longer lead to inhomogeneous deflections. As a result, the long time stability and the accuracy of measurement can be improved.

A pressure measuring apparatus of the invention comprises a pressure sensor of the invention and a housing, which in its interior has a sensor chamber, in which the pressure sensor is arranged, and at least one hydraulic path, which extends from an outer surface of the housing into the sensor chamber, in order to supply a pressure to be measured to a surface of the measuring membrane.

In an embodiment of the pressure measuring apparatus, an opening of the hydraulic path in the outer surface of the housing is covered by an isolating diaphragm, which is connected along an edge pressure tightly to the outer surface of the housing, and wherein the volume enclosed between the isolating diaphragm and the measuring membrane of the hydraulic path is filled with a pressure transmission medium, e.g. an incompressible liquid.

BRIEF DESCRIPTION OF THE DRAWINGS

The invention will now be explained on the basis of an example of an embodiment illustrated in the drawing, the figures of which show as follows.

DETAILED DISCUSSION IN CONJUNCTION WITH THE DRAWINGS

Figure 1:
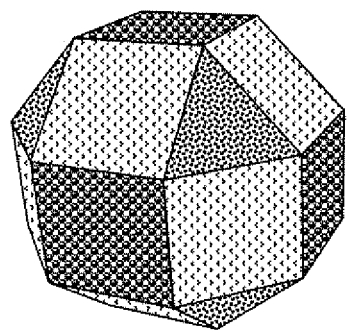
FIG. 1 is a representation of the principal crystal planes of a silicon crystal.

As background information for the present invention, FIG. 1 shows the principal crystal planes {100}, {110} and {111} of a silicon crystal as well as their orientation relative to one another.

Figure 2:
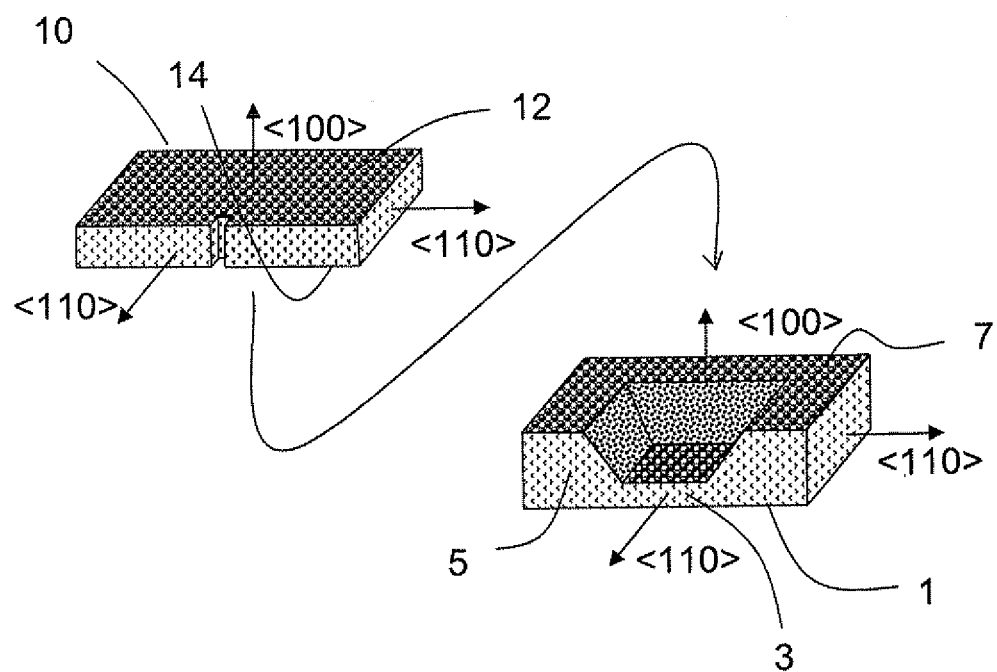
FIG. 2 is a perspective sectional view of a membrane body of the invention and a substrate of the invention.

As shown in FIG. 2, a membrane body 1 comprises monocrystalline silicon. It has a measuring membrane 3, which extends in a {100} plane. The measuring membrane is prepared in a silicon crystal using an etch process, wherein {111} planes are formed by the etch process; the {111} planes border an edge region 5 of the membrane body for the measuring membrane 3. A first mounting surface 7 extends parallel to the measuring membrane, thus also with a {100} orientation. Planes {110} extend perpendicular to the surface of the measuring membrane 3 and perpendicular to the mounting surfaces; the planes {110} are perpendicular to one another and border the membrane body laterally. The membrane body 1 is to be joined to a substrate 10, which has a {100} plane 12 and a {100} plane 14 parallel thereto, wherein the latter serves as a second mounting surface. The substrate is likewise laterally bordered by {110} planes. In the manufacture of the pressure sensor of the invention, the membrane body 1 and substrate 10 are oriented relative to one another in a manner such that the first mounting surface lies against the second mounting surface and the {110} planes of membrane body 1 and substrate 10, in each case, extend parallel relative to one another. The membrane body 1 and the substrate 10 are joined to one another in this orientation by fusion bonding, wherein this especially happens in assembling the wafer before the pressure sensors are separated by sawing the wafers along the {110} planes. The wafers have corresponding orientation marks, which enable the described orientation of the membrane body and substrate relative to one another.

Figure 3:
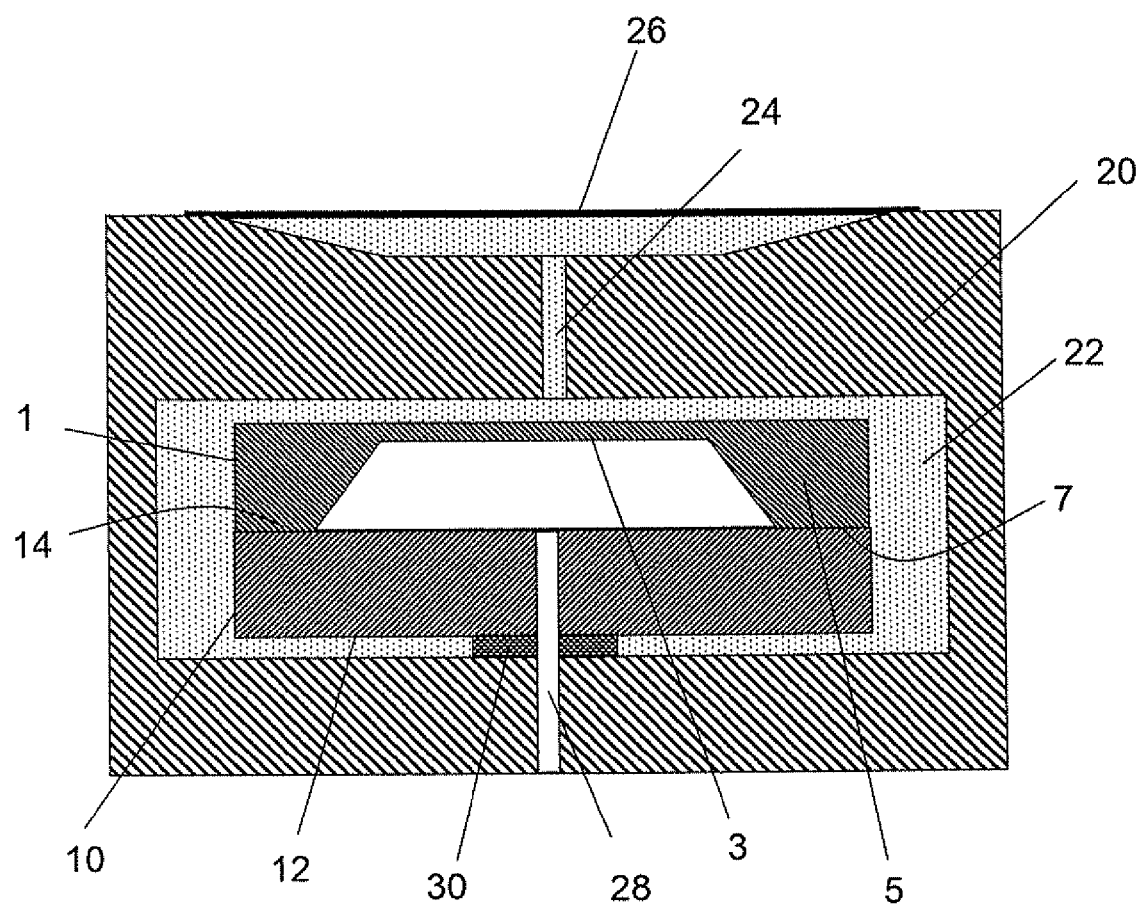
FIG. 3 is a longitudinal section through a pressure measuring apparatus of the invention.

FIG. 3 shows a pressure measuring apparatus of the invention, in which a pressure sensor of the invention, comprising a membrane body 1 and a substrate 10 joined to one another along the first mounting surface 7 and the second mounting surface 14, is arranged in a sensor chamber 22 in a metal housing 20. The pressure measuring apparatus shown is a relative pressure measuring apparatus, in which a measuring membrane 3 of the semiconductor pressure sensor is supplied with a media pressure acting on an isolating diaphragm 26. This happens via a capillary line 24, which extends to a surface of the housing 20. The isolating diaphragm 26 is connected to the surface of the housing 20 by an encompassing weld seam, wherein the free volume of the sensor chamber 22 and the volume enclosed under the isolating diaphragm are filled with a pressure transmission medium, e.g. an incompressible liquid. A duct 28 on the rear side extends through the housing and through the substrate 10; the rear side of the measuring membrane 3 is supplied by the duct 28 with atmospheric pressure as a reference pressure. The substrate is affixed to a rear side of the sensor chamber 22 by means of a pressure bearing joint, formed, for example, an adhesive 30, through which the channel 28 extends.

The invention claimed is:

1. A pressure sensor, comprising:
a monocrystalline membrane body, which includes a measuring membrane and an edge region surrounding said measuring membrane, said edge region has a greater material thickness than said measuring membrane;
said edge region has a first mounting surface, whose surface normal is given by a first principal crystal axis; and
a monocrystalline substrate, which, with respect to crystal structure, comprises the same semiconductor material as said membrane body, wherein:
said substrate has a second mounting surface, whose surface normal extends parallel to said first principal crystal axis;
said membrane body is tightly connected to said substrate by joining said first mounting surface to said second mounting surface; and
the orientations of principal crystal axes of said membrane body and said substrate are, in each case, oriented parallel relative to one another.

2. The pressure sensor as claimed in claim 1, wherein:
said membrane body and said substrate comprise Si, SiC or sapphire.

3. The pressure sensor according to claim 1, wherein:
the first principal crystal axis is a <100>, <111> axis.

4. The pressure sensor as claimed in claim 1, wherein:
said first mounting surface and said second mounting surface are joined by means of a eutectic bond.

5. The pressure sensor as claimed in claim 1, wherein:
said first mounting surface and said second mounting surface are joined by means of fusion bonding.

6. The pressure sensor as claimed in claim 5, wherein:
said first mounting surface and said second mounting surface are joined in a wafer assembly.

7. The pressure sensor as claimed in claim 1, further comprising:
a transducer for transducing a pressure dependent deflection of said measuring membrane into an electrical signal.

8. The pressure sensor as claimed in claim 7, wherein:
said transducer is a (piezo) resistive transducer or a capacitive transducer.

9. The pressure sensor as claimed in claim 1, wherein:
said pressure sensor is an absolute pressure sensor, a relative pressure sensor or a pressure difference sensor.

10. The pressure measuring apparatus, comprising:
a pressure sensor;
a monocrystalline membrane body, which includes a measuring membrane and an edge region surrounding said measuring membrane, said edge region has a greater material thickness than said measuring membrane; said edge region has a first mounting surface, whose surface normal is given by a first principal crystal axis; and a monocrystalline substrate, which, with respect to crystal structure, comprises the same semiconductor material as said membrane body, wherein: said substrate has a second mounting surface, whose surface normal extends parallel to said first principal crystal axis; said membrane body is tightly connected to said substrate by joining said first mounting surface to said second mounting surface; and the orientations of principal crystal axes of said membrane body and said substrate are, in each case, oriented parallel relative to one another;
a housing, inside of which is a sensor chamber, in which said pressure sensor is arranged; and
at least one hydraulic path, which extends from an outer surface of said housing into said sensor chamber in order to supply a surface of said measuring membrane with a pressure to be measured.

11. The pressure measuring apparatus as claimed in claim 10, wherein:
an opening of the hydraulic path in the outer surface of said housing is covered by an isolating diaphragm, which is connected pressure tightly along an edge with the outer surface of said housing; and
the volume of the hydraulic path enclosed between said isolating diaphragm and said measuring membrane is filled with a pressure transmission medium.

* * * * *